US007509203B2

(12) United States Patent
Imamura et al.

(10) Patent No.: US 7,509,203 B2
(45) Date of Patent: Mar. 24, 2009

(54) LOCK-UP CONTROL FOR TORQUE CONVERTER

(75) Inventors: Tatsuya Imamura, Fuji (JP); Hiroshi Sekiya, Fuji (JP); Toshiji Iida, Fuji (JP); Koji Dohi, Fuji (JP); Satoshi Segawa, Kanagawa (JP)

(73) Assignees: Jatco Ltd, Shizuoka (JP); Nissan Motor Co., Ltd., Kanagawa (JP)

( * ) Notice: Subject to any disclaimer, the term of this patent is extended or adjusted under 35 U.S.C. 154(b) by 781 days.

(21) Appl. No.: 11/089,540

(22) Filed: Mar. 25, 2005

(65) Prior Publication Data

US 2005/0222738 A1     Oct. 6, 2005

(30) Foreign Application Priority Data

Mar. 31, 2004    (JP)   .............................. 2004-106506

(51) Int. Cl.
    *G06F 7/00*      (2006.01)
    *F16H 61/14*    (2006.01)
(52) U.S. Cl. .............................. 701/67; 701/68; 701/50; 701/51; 192/3.51; 475/43; 477/8; 477/70; 477/166
(58) Field of Classification Search ............. 701/67–68; 192/3.3, 3.31, 3.51; 477/65, 67, 180, 8, 70, 477/166; 91/471; 475/43
See application file for complete search history.

(56) References Cited

U.S. PATENT DOCUMENTS 4,576,260 A * 3/1986 Koshimo ................... 192/3.31

(Continued)

FOREIGN PATENT DOCUMENTS

JP     62-241740     10/1987

(Continued)

OTHER PUBLICATIONS

Slip control for a lock-up clutch with a robust control method: Adachi, K.; Ochi, Y.; Segawa, S.; Higashimata, A.; SICE 2004 Annual Conference; vol. 1, Aug. 4-6, 2004 pp. 744-749 vol 1.*

(Continued)

*Primary Examiner*—Cuong H Nguyen
(74) *Attorney, Agent, or Firm*—Foley & Lardner LLP

(57) ABSTRACT

A lock-up clutch control device which controls a lock-up clutch provided in a torque converter installed between an engine and a transmission, is disclosed. The lock-up clutch control device changes over between a converter state and a lock-up state of the torque converter according to a differential pressure command value (LUprs) relating to a differential pressure supplied to the lock-up clutch. The lock-up clutch control device includes a differential pressure generating device (7, 8) which generates the differential pressure supplied to the lock-up clutch; input torque detection means (2, 14, 15) which detects an input torque (Te) to the torque converter; and a controller (1). The controller (1) is programmed to compute a real differential pressure (P_lu) based on the detected input torque (Te) upon completion of the engagement of the lock-up clutch; compute a learning value (P_learn(Tai)) relating to a differential pressure deviation, based on the difference between the computed real differential pressure (P_lu) and differential pressure command value (P_ref) upon completion of the engagement of the lock-up clutch, and store the learning value (P_learn(Tai)); correct a present differential pressure command value (LUprs_slp) based on the learning value (P_learn(Tai)); and send the corrected differential pressure command value (LUprs) to the differential pressure generating device (7, 8).

12 Claims, 8 Drawing Sheets

U.S. PATENT DOCUMENTS

| | | | | |
|---|---|---|---|---|
| 4,744,031 | A | * | 5/1988 | Takeda et al. .................. 701/66 |
| 4,819,777 | A | | 4/1989 | Yasue et al. |
| 4,947,734 | A | * | 8/1990 | Fujita et al. .................... 91/471 |
| 4,989,702 | A | * | 2/1991 | Yoshimura et al. ......... 192/3.29 |
| 5,105,926 | A | * | 4/1992 | Yoshimura et al. .......... 477/169 |
| 5,318,159 | A | * | 6/1994 | Kashiwabara ................ 477/169 |
| 5,332,073 | A | * | 7/1994 | Iizuka ......................... 192/3.3 |
| 5,417,622 | A | * | 5/1995 | Asayama et al. ............... 477/63 |
| 5,573,473 | A | * | 11/1996 | Asayama et al. .............. 477/63 |
| 5,611,750 | A | * | 3/1997 | Kono et al. .................... 477/65 |
| 5,743,828 | A | * | 4/1998 | Kuriyama et al. ........... 477/169 |
| 5,752,895 | A | * | 5/1998 | Sugiyama et al. ........... 477/169 |
| 6,085,136 | A | | 7/2000 | Katakura et al. |
| 6,283,893 | B1 | * | 9/2001 | Fritzner et al. ............... 477/176 |
| 6,512,971 | B2 | * | 1/2003 | Koumura et al. ............... 701/51 |
| 6,743,150 | B2 | * | 6/2004 | Takatori et al. ............. 477/176 |
| 6,780,140 | B2 | * | 8/2004 | Okamoto et al. ............... 477/62 |
| 6,782,984 | B2 | * | 8/2004 | Tsunekawa et al. ......... 192/3.31 |
| 7,195,581 | B2 | * | 3/2007 | Segawa et al. ............... 477/180 |
| 7,286,922 | B1 | * | 10/2007 | Fischer et al. ................. 701/51 |
| 7,287,631 | B2 | * | 10/2007 | Imamura et al. ............. 192/3.3 |
| 7,361,120 | B2 | * | 4/2008 | Iida et al. ....................... 477/65 |
| 2002/0038174 | A1 | * | 3/2002 | Koumura et al. .............. 701/51 |
| 2002/0077218 | A1 | * | 6/2002 | Segawa et al. ................ 477/176 |
| 2005/0217957 | A1 | * | 10/2005 | Imamura et al. ............. 192/3.3 |
| 2005/0222738 | A1 | * | 10/2005 | Imamura et al. .............. 701/67 |
| 2006/0122755 | A1 | * | 6/2006 | Segawa et al. ................. 701/67 |
| 2008/0255735 | A1 | * | 10/2008 | Marathe et al. ............... 701/50 |

FOREIGN PATENT DOCUMENTS

| | | | | |
|---|---|---|---|---|
| JP | 03-014965 | | * | 1/1991 |
| JP | 3-014965 | A | | 1/1991 |
| JP | 8277932 | | * | 10/1996 |
| JP | 10-089463 | A | | 4/1998 |
| JP | 10089463 | | * | 4/1998 |
| JP | 8-277932 | A | | 10/1999 |
| JP | 2000-27986 | A | | 1/2000 |
| JP | 2001-241545 | | * | 9/2001 |
| JP | 2001-241545 | | | 9/2001 |
| JP | 02004232870 | A | * | 8/2004 |
| JP | 2005291345 | A | * | 10/2005 |
| JP | 02005291345 | A | * | 10/2005 |
| JP | 2007030679 | A | * | 2/2007 |
| JP | 2007064477 | A | * | 3/2007 |
| JP | 2007182972 | A | * | 7/2007 |

OTHER PUBLICATIONS

On the Use of Torque-Biasing Systems for Electronic Stability Control: Limitations and Possibilities; Piyabongkarn, D.; Lew, J. Y.; Rajamani, R.; Grogg, J. A.; Yuan, Q.; Control Systems Technology, IEEE Transactions on; vol. 15, Issue 3, May 2007 pp. 581-589; Digital Object Identifier 10.1109/TCST.2007.894656.*

Validation of Mechanical Transmission with Clutch using Hardware-In-the-Loop Simulation; Lhomme, W.; Trigui, R.; Bouscayrol, A.; Delarue, P.; Jeanneret, B.; Badin, F.; Vehicle Power and Propulsion Conference, 2007. VPPC 2007. IEEE Sep. 9-12, 2007 pp. 425-431; Digital Object Identifier 10.1109/VPPC.2007.4544164.*

Simulation and control of an automotive dry clutch Serrarens, A.; Dassen, M.; Steinbuch, M.; American Control Conference, 2004. Proceedings of the 2004 vol. 5, Jun. 30-Jul. 2, 2004 pp. 4078-4083 vol. 5.*

On the Use of Torque-Biasing Systems for Electronic Stability Control: Limitations and Possibilities; Piyabongkarn, D.; Lew, J.Y.; Rajamani, R.; Grogg, J.A.; Qinghui Yuan; Control Systems Technology, IEEE Transactions on; vol. 15, Issue 3, May 2007 pp. 581-589; Digital Object Identifier 10.1109/TCST.2007.894656.*

Multi-model of a hybrid electric vehicle's four-wheel drive system with automatically-engaging clutch; Lhomme, W.; Hancock, M.J.; Assadian, F.; Cieslar, D.; Vehicle Power and Propulsion Conference, 2008. VPPC '08. IEEE; Sep. 3-5, 2008 pp. 1-6 Digital Object Identifier 10.1109/VPPC.2008.4677566.*

Modeling and performance simulation of transmission system for car equipped with metal pushing V-belt type CVT; Meilan Zhou,; Jiabin Wen,; Xudong Wang,; Yongqin Zhou,; Vehicle Power and Propulsion Conference, 2008. VPPC '08. IEEE Sep. 3-5, 2008 pp. 1-5; Digital Object Identifier 10.1109/VPPC.2008.4677417.*

Validation of Mechanical Transmission with Clutch using Hardware-In-the-Loop Simulation; Lhomme, W.; Trigui, R.; Bouscayrol, A.; Delarue, P.; Jeanneret, B.; Badin, F.; Vehicle Power and Propulsion Conference, 2007. VPPC 2007. IEEE; Sep. 9-12, 2007 pp. 425-431; Digital Object Identifier 10.1109/VPPC.2007.4544164.*

Design and experiments on a new wheel-based cable climbing robot; Fengyu Xu; Xingsong Wang; Advanced Intelligent Mechatronics, 2008. AIM 2008. IEEE/ASME International Conference on; Jul. 2-5, 2008 pp. 418-423; Digital Object Identifier 10.1109/AIM.2008.4601697.*

Modeling torque transmissibility for automotive dry clutch engagement; Vasca, F.; Iannelli, L.; Senatore, A.; Scafati, M.T.; American Control Conference, 2008; Jun. 11-13, 2008 pp. 306-311; Digital Object Identifier 10.1109/ACC.2008.4586508.*

Improved manipulation efficiency using a serial-type dual actuator unit; Byeong-Sang Kim; Jung-Jim Park; Jae-Bok Song; Control, Automation and Systems, 2007. ICCAS '07. International Conference on; Oct. 17-20, 2007 pp. 30-35 Digital Object Identifier 10.1109/ICCAS.2007.4406874.*

Research and Development of Automatic Transmission Electronic Control System; Weibin Yang; Guangqiang Wu; Jianwu Dang; Integration Technology, 2007. ICIT '07 IEEE International Conference on; Mar. 20-24, 2007 pp. 442-445 Digital Object Identifier 10.1109/ICITECHNOLOGY.2007.4290514.*

Study on Real-Time Simulation System of Vehicle Dynamics Via ve-DYNA; Ma Zhou; Liu Zhiyuan; Lu Jinbo; Chen Hong; Vehicular Electronics and Safety, 2006. ICVES 2006. IEEE International Conference on; Dec. 13-15, 2006 pp. 454-458 Digital Object Identifier 10.1109/ICVES.2006.371634.*

Switched Causal Modeling of Transmission with Clutch in Hybrid Electric Vehicles; Lhomme, W.; Trigui, R.; Delarue, P.; Jeanneret, B.; Bouscayrol, A.; Badin, F.; Vehicle Power and Propulsion Conference, 2006. VPPC '06. IEEE; Sep. 6-8, 2006 pp. 1-6; Digital Object Identifier 10.1109/VPPC.2006.364345.*

Inverse Dynamic Simulation of Non-Quadratic MIMO Powertrain Models -Application to Hybrid Vehicles; Froberg, A.; Vehicle Power and Propulsion Conference, 2006. VPPC '06. IEEE; Sep. 6-8, 2006 pp. 1-6; Digital Object Identifier 10.1109/VPPC.2006.364292.*

Modeling and Simulation of Continuously Variable Transmission for Passenger Car; Zhou Meilan; Wang Xudong; Zhou Yongqin; Strategic Technology, The 1st International Forum on; Oct. 18-20, 2006 pp. 100-103; Digital Object Identifier 10.1109/IFOST.2006.312258.*

* cited by examiner

LOCK-UP CONTROL FOR TORQUE CONVERTER

FIELD OF THE INVENTION

This invention relates to a control device for controlling lock-up of a torque converter.

BACKGROUND OF THE INVENTION

In a torque converter provided with a lock-up clutch, control of a front-rear differential pressure (lock-up differential pressure) of the lock-up clutch engages and releases the lock-up clutch. To shift the torque converter from a converter state to a lock-up state, the lock-up differential pressure gradually increases from a predetermined initial differential pressure. The torque converter shifts from the converter state to the lock-up state via a slip state. In the converter state the lock-up clutch is released, in the slip state the lock-up clutch slips, and in the lock-up state, the lock-up clutch is engaged.

In this lock-up clutch control, the real lock-up clutch differential pressure has scatter due to individual differences and time-dependent variations of the torque converter. JP2000-27986 published by the Japan Patent Office in 2000 discloses a prior art technique wherein learning control of the differential pressure is performed in order to correct the deviation of engagement timing due to this scatter.

SUMMARY OF THE INVENTION

However, in the aforesaid prior art, when lock-up is performed during coasting of the vehicle (when the accelerator pedal stroke is zero), learning is performed after decreasing the front-rear differential pressure of the lock-up clutch until a small slip occurs, and unless coasting of the vehicle is continued for a long time, the differential pressure learning value is not appropriate. Therefore, time was taken to complete learning.

Further, in the case of smooth lock-up where the accelerator pedal stroke is small (where the throttle valve has a low opening), the real differential pressure occasionally varies due to an oil temperature variation.

For example, if the real differential pressure is larger than a differential pressure command value due to scatter in the real differential pressure, the engine rotation speed will rapidly decrease, causing a shock due to early engagement, and the driver will experience discomfort. Conversely, if the real differential pressure becomes smaller than the differential pressure command value due to scatter in the real differential pressure, it takes a long time for lock-up to complete, and the fuel consumption rate will be impaired.

It is therefore an object of this invention to rapidly learn a differential pressure while taking an oil temperature variation into consideration, and to eliminate the deviation of engagement timing.

In order to achieve the above object, this invention provides a lock-up clutch control device which controls a lock-up clutch provided in a torque converter installed between an engine and a transmission. The lock-up clutch control device changes over between a converter state and a lock-up state of the torque converter according to a differential pressure command value relating to a differential pressure supplied to the lock-up clutch. The lock-up clutch control device comprises a differential pressure generating device which generates the differential pressure supplied to the lock-up clutch; input torque detection means which detects an input torque to the torque converter; and a controller. The controller is programmed to compute a real differential pressure based on the detected input torque upon completion of the engagement of the lock-up clutch; compute a learning value relating to a differential pressure deviation, based on the difference between the computed real differential pressure and differential pressure command value upon completion of the engagement of the lock-up clutch, and store the learning value; correct a present differential pressure command value based on the learning value; and send the corrected differential pressure command value to the differential pressure generating device.

The details as well as other features and advantages of this invention are set forth in the remainder of the specification and are shown in the accompanying drawings.

BRIEF DESCRIPTION OF THE DRAWINGS

FIG. 7 is a time chart showing an engagement control state of the lock-up clutch.

FIG. 8 is a time chart showing release control of the lock-up clutch.

DESCRIPTION OF THE PREFERRED EMBODIMENTS

Figure 1:
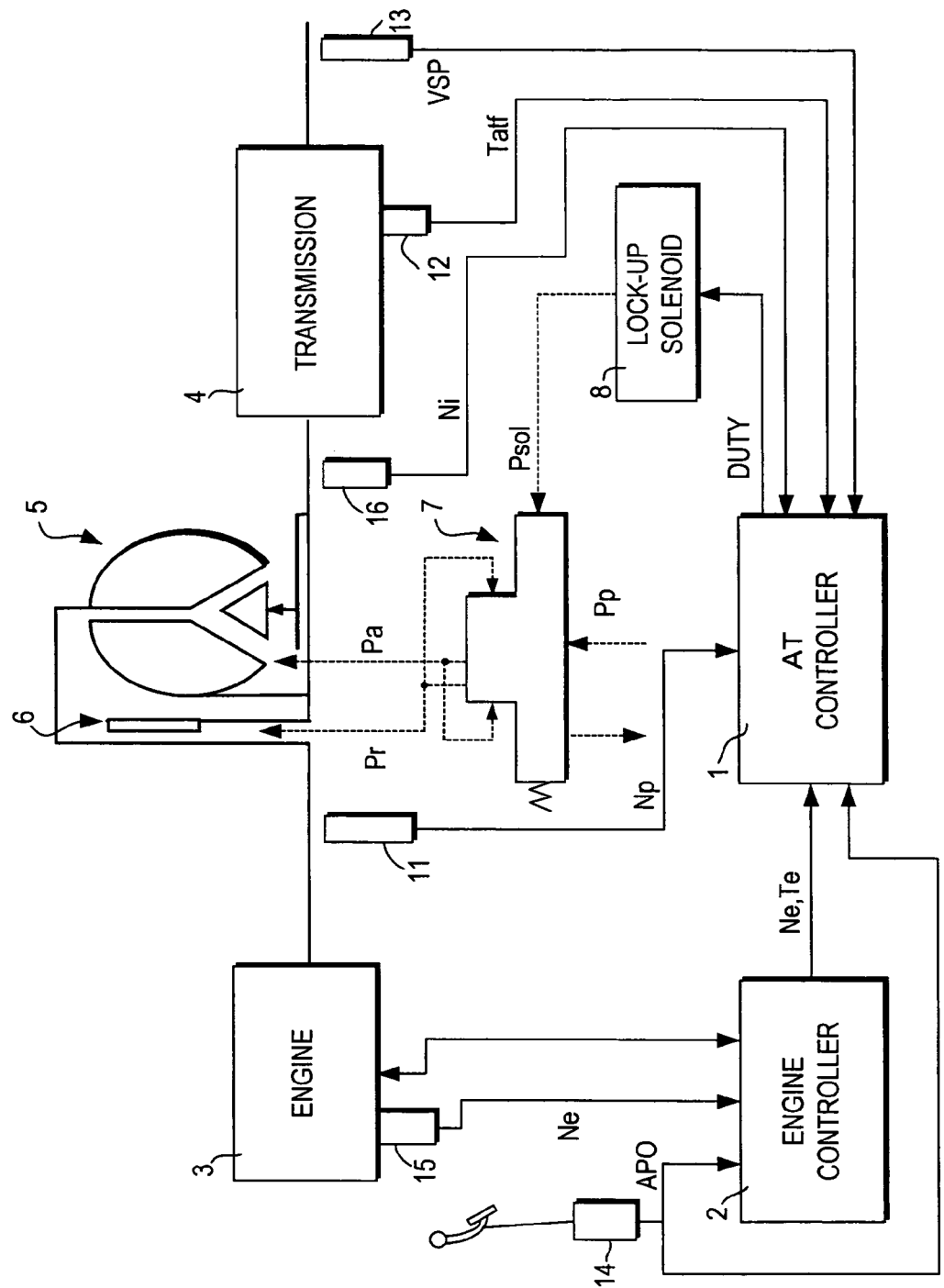
FIG. 1 is a block diagram of a vehicle drive system comprising an automatic transmission according to this embodiment.

An automatic transmission comprising a torque converter 5 and a transmission 4 is connected to an engine 3. The torque converter 5 is provided with a lock-up clutch 6, the lock-up clutch 6 being in a lock-up state (engaged state) or unlocked state (release state) according to the vehicle running state.

The torque converter 5 houses the lock-up clutch which rotates with a torque converter output element (i.e. turbine). When the lock-up clutch 6 is directly connected to a torque converter input element (i.e. impeller), the torque converter 5 enters a lock-up state wherein the input and output elements are engaged by the lock-up clutch 6.

The lock-up clutch 6 responds to a differential pressure Pa-Pr between the torque converter apply pressure Pa and torque converter release pressure Pr on front and rear sides thereof. When the release pressure Pr is higher than the apply pressure Pa, the lock-up clutch 6 is released and the torque converter input and output elements are not directly connected. When the release pressure Pr is lower than the apply pressure Pa, the lock-up clutch 6 is engaged and the torque converter input and output elements are directly connected.

The engaging force, i.e., the lock-up capacity (transmitted torque) of the lock-up clutch 6, is determined by the differential pressure Pa-Pr. The engaging force of the lock-up clutch 6 increases and lock-up capacity increases, the larger the differential pressure is.

The differential pressure Pa-Pr is controlled by a lock-up control valve 7 known in the art. The lock-up control valve 7 is disclosed for example in U.S. Pat. No. 5,332,073 issued Jul. 26, 1994 to Iizuka, or U.S. Pat. No. 5,752,895 issued May 19, 1998 to Sugiyama et al.

In this embodiment, a lock-up solenoid valve 8 generates a line pressure Psol according to a duty signal DUTY, using a pump pressure Pp as an original pressure. The line pressure Psol acts on the lock-up control valve 7. In the lock-up control valve 7, the apply pressure Pa and release pressure Pr are mutually opposed. A spring pushing force is applied in the same direction as the apply pressure Pa, a spring pushing force is applied in the same direction as the release pressure Pr, and the line pressure Psol simultaneously acts in the same direction as the release pressure Pr. The lock-up control valve 7 determines the differential pressure Pa-Pr so that the oil pressures and spring forces balance each other. The lock-up solenoid valve 8 and lock-up control valve 7 form a differential pressure generating device which generates the differential pressure applied to the lock-up clutch.

An AT controller 1 comprising a microcomputer determines a duty signal DUTY according to the vehicle running state, and controls the differential pressure Pa-Pr via the lock-up solenoid valve 8. The AT controller 1 comprises a microcomputer comprising a central processing unit (CPU), random access memory (RAM), read-only memory (ROM), input and output (I/O) interface and timer. The read-only memory (ROM) may be a programmable ROM.

The AT controller 1 receives signals which indicate a vehicle running state and a driver state. These signals are for example an input shaft rotation speed Ni of the transmission 4 detected by an input shaft rotation sensor 16 (first rotation speed sensor), a pump impeller rotation speed Np detected by an impeller rotation sensor 11 (second rotation speed sensor), an accelerator pedal stroke APO (or opening TVO of a throttle valve) detected by an accelerator pedal stroke sensor 14, an oil temperature Tatf detected by an oil temperature sensor 12 and a vehicle speed VSP detected by a vehicle speed sensor 13. The input shaft of the transmission 4 coincides with the output shaft of the torque converter 5, and the input shaft rotation speed to the transmission 4 is equivalent to the output shaft rotation speed from the torque converter 5. The pump impeller rotation speed Np is equivalent to the input rotation speed (which is equal to an engine rotation speed Ne) to the torque converter 5. The AT controller 1 receives the engine rotation speed Ne and engine torque Te from an engine controller 2. The engine torque Te may be an engine torque command value set by the engine controller 2. With these signals, the AT controller 1 performs the engagement/release of the lock-up clutch 6, and performs slip control. The engine rotation speed Ne is detected by an engine rotation speed sensor 15, and is inputted into engine controller 2.

The engine controller 2 comprises a microcomputer comprising a central processing unit (CPU), random access memory (RAM), read-only memory (ROM) and input/output (I/O) interface. The engine controller 2 and AT controller 1 may be integrated in one controller.

The AT controller 1 performs a smooth lock-up control according to the vehicle running state. The smooth lock-up control engages the lock-up clutch 6 from a converter state via a slip state and is performed for example when variation in the accelerator pedal stroke APO is small and the vehicle speed VSP increases gradually.

In this embodiment, when engagement of the lock-up clutch 6 is complete, the AT controller 1 learns a deviation of the real differential pressure from a differential pressure command value P_ref upon completion of the engagement of the lock-up clutch, and on the next occasion lock-up is performed, corrects the differential pressure command value LUprs_slp using this learning value.

Figure 2:
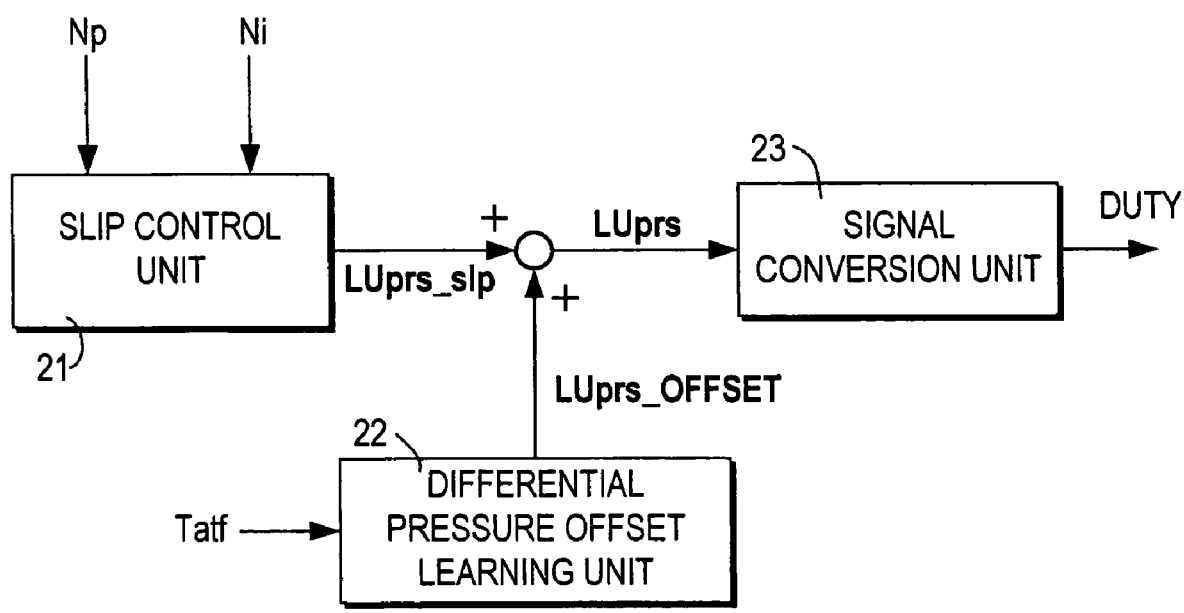
FIG. 2 is a block diagram showing a slip control performed by an AT (automatic transmission) controller.

FIG. 2 is a control block diagram showing an outline of slip control (or differential pressure control of the lock-up clutch) according to this embodiment, and shows a part of the functions of the AT controller 1. The control routine shown in FIG. 2 is repeatedly performed every control period. Each unit may represent a command set performed by the controller, or an electrical circuit. The AT controller 1 determines ON/OFF of lock-up based on running conditions such as vehicle speed. During engagement/release of the lock-up clutch after lock-up ON/OFF changes, slip control is performed.

A slip control unit 21 calculates a slip rotation speed Nslp from the difference of the pump impeller rotation speed Np and input shaft rotation speed Ni (output rotation speed from the torque converter 5). That is, Nslp=Np−Ni. The slip control unit 21 outputs a slip command value LUprs_slp which is the differential pressure command value which may increase as the slip rotation speed Nslp decreases. For example, in a feedback/feedforward control, the slip command value LUprs_slp is determined such that the slip rotation speed Nslp converges to a target value set based on the vehicle operating state.

A differential pressure offset learning unit 22 calculates a differential pressure deviation learning value LUprs_OFFSET (=P_learn(Tai)) according to the oil temperature Tatf as described later. The initial value of the corrected differential pressure command value LUprs is computed by adding the differential pressure deviation learning value LUprs_OFFSET to the initial slip command value LUprs_slp (initial value of LUprs=initial value of LUprs_slp+LUprs_OFFSET).

Figure 3:
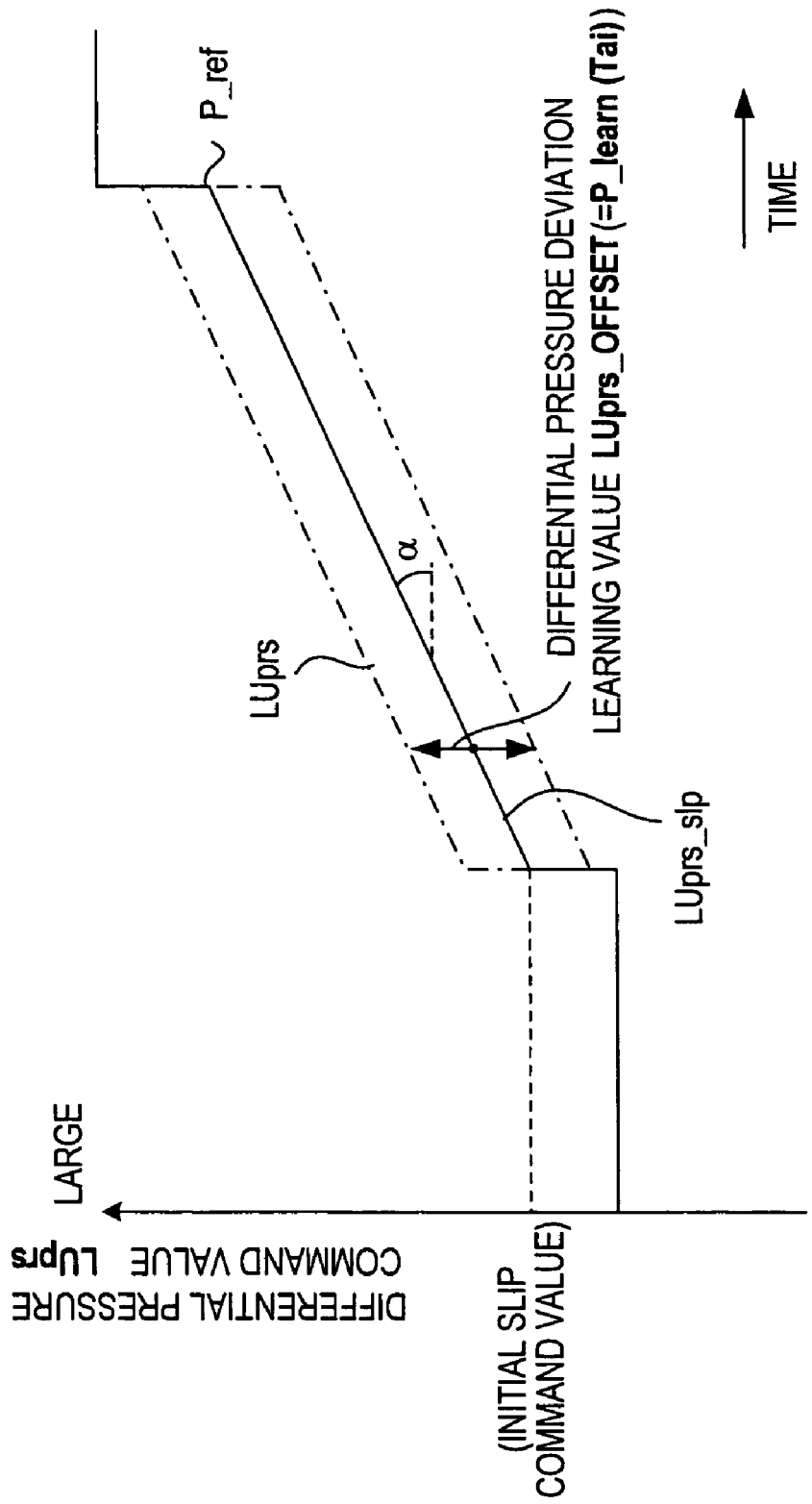
FIG. 3 is a graph showing a differential pressure command value and a differential pressure deviation learning value LUprs_OFFSET, and showing a relation between a differential pressure command value and time.

A signal conversion unit 23 (signal generator) converts the corrected differential pressure command value LUprs to the duty signal DUTY, and sends it to the lock-up solenoid valve 8. As shown in FIG. 3, an increment corresponding to a predetermined slope $\alpha$ is added to LUprs_slp every control period of the slip control shown in FIG. 2 (LUprs_slp=LUprs_slp+$\alpha$) so that the corrected differential pressure command value LUprs gradually increases every control period during slip control. After the differential pressure command value LUprs_slp has increased for a predetermined period Tx, it is finally set to a predetermined differential pressure command value P_ref (differential pressure upon completion of engagement). The differential pressure command value P_ref upon completion of engagement increases according to the input torque Te (in other words, the engine torque Te) to the torque converter 5.

Figure 4:
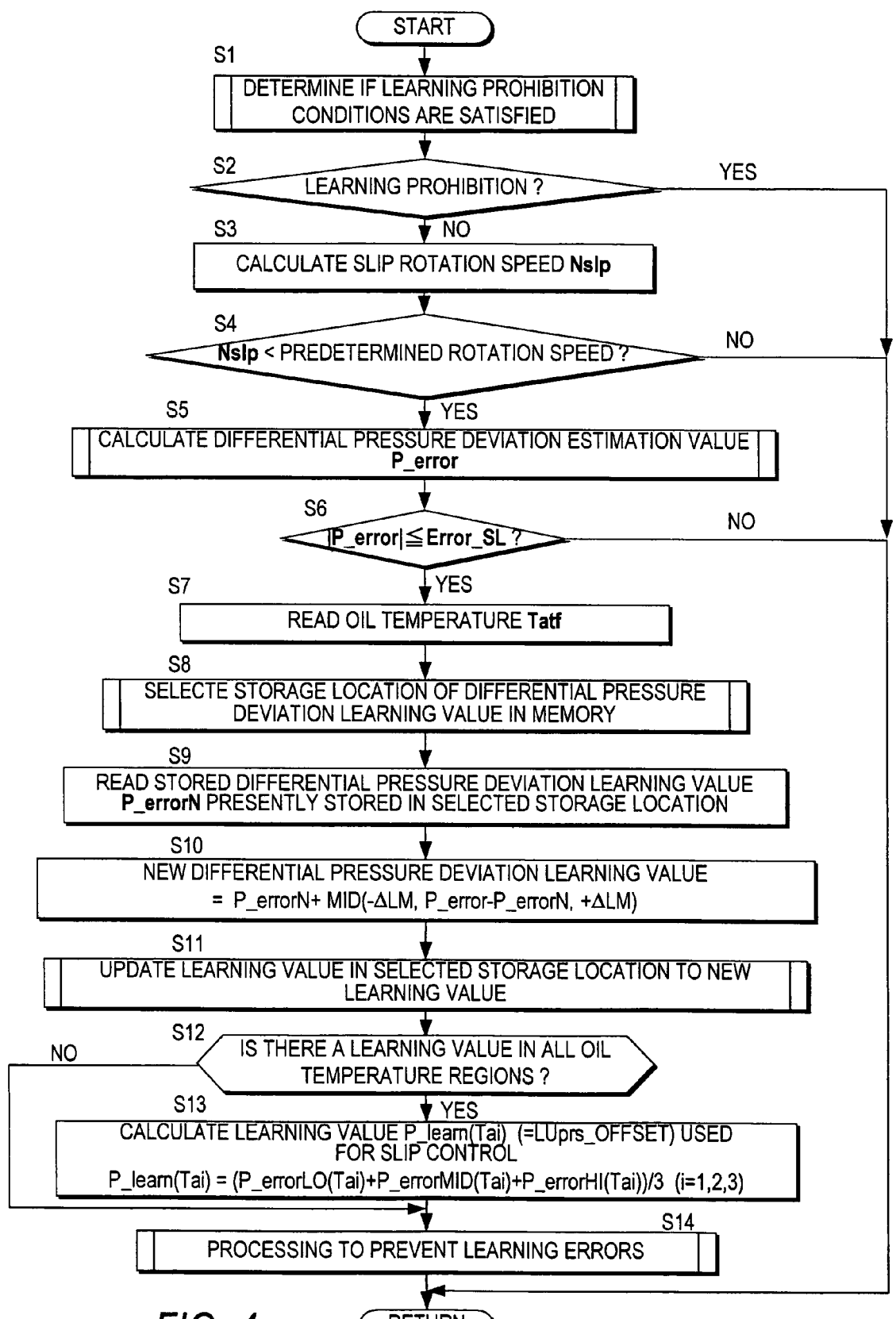
FIG. 4 is a flowchart showing an example of a learning control performed by an AT controller.

A typical learning control routine performed by the AT controller 1 will now be described referring to the flowchart of FIG. 4. This control routine is repeatedly performed at a predetermined control period (e.g., several milliseconds) after smooth lock-up has started.

First, in a step S1, a learning prohibition flag showing that the present running state satisfies learning prohibition conditions is set based on the detection values read from the sensors.

The learning prohibition conditions are as follows:
(1) The engine torque Te from the engine controller 2 is abnormal.
(2) The engine torque Te is unstable.
(3) The engine rotation speed Ne is sharply varying.
(4) The input shaft rotation speed Ni is sharply varying.
(5) The oil temperature Tatf lies outside a learning permission temperature range where learning is permitted.
(6) The engine torque Te lies outside a learning permission engine torque range where learning is permitted.
(7) The variation of the differential pressure command value LUprs is more than a predetermined variation.

If at least one of the conditions (1)-(7) is satisfied, the learning prohibition flag is set to 1, and if none of the conditions is satisfied, the learning prohibition flag is reset to 0.

The reason for setting the learning prohibition conditions (1), (2), (3) is to prohibit learning of the differential pressure deviation when the engine has stopped, when there is interference with communication or when the engine 3 is in a transient state (when the accelerator pedal is being depressed or released), and to calculate a differential pressure deviation learning value based on the engine torque Te received from the engine controller 2 in the steady state of the engine.

The reason for setting the learning prohibition condition (4) is that when the input shaft rotation speed Ni is sharply varying, the drive system inertia is added to the torque and a precise differential pressure deviation learning value cannot be obtained. When the input shaft rotation speed Ni the sharply varying, learning of the differential pressure deviation is prohibited.

The reason for setting the learning prohibition condition (5) is to prohibit learning at an extreme oil temperature Tatf above a preset upper limit T_MAX and at an extreme oil temperature Tatf below a preset lower limit T_MIN. The learning permission temperature range from the lower limit T_MIN to the upper limit T_MAX may be the temperature range wherein lock-up can be performed.

The reason for setting the learning prohibition condition (6) is that when the engine torque Te is very small or very large, the error in the engine torque Te sent from the engine controller 2 is large. Learning of the differential pressure deviation is prohibited in the engine torque range when this error is large.

The reason for setting the learning prohibition condition (7) is that when the variation rate of the differential pressure command value LUprs is equal to or greater than a predetermined value, the differential pressure command value itself is sharply varying. The variation rate of the differential pressure command value LUprs is obtained by calculating the difference between the present differential pressure command value LUprs and the differential pressure command value at a predetermined earlier time.

The setting or resetting of the learning prohibition flag is performed on the basis of the above learning prohibition conditions.

Next, in a step S2, it is determined whether or not the learning prohibition flag is 1. When the learning prohibition flag is 1, the control routine is terminated without performing learning of the differential pressure deviation. When the learning prohibition flag is 0, learning is permitted so the routine proceeds to a step S3.

In the step S3, the slip rotation speed Nslp is calculated from the difference of the pump impeller rotation speed Np and input shaft rotation speed Ni (Nslp=Np−Ni).

Next, in a step S4, the slip rotation speed Nslp is compared with a predetermined rotation speed (for example, 10 rpm), and it is determined whether or not the slip rotation speed Nslp is less than the predetermined rotation speed, i.e., whether or not engagement of the lock-up clutch 6 is complete.

When engagement of the lock-up clutch 6 is complete i.e., when the slip rotation speed Nslp is less than the predetermined rotation speed, the routine proceeds to a step S5. In the step S5, a differential pressure deviation estimation value P_error which is the estimated value of the deviation between the differential pressure command value P_ref and the real differential pressure, is computed upon completion of engagement. The current differential pressure command value LUprs_slp is the differential pressure command value P_ref upon completion of engagement P_ref.

The differential pressure deviation estimation value P_error is calculated based on an engine torque signal TrqENG received from the engine controller 2, by: P_error= (|TrqENG|−β−α×P_ref)/α

Herein, TrqENG is the engine torque, β is a correction amount of the differential pressure command value LUprs for each oil temperature, α is the variation amount (slope) shown in FIG. 3, and P_ref is the differential pressure command value when engagement is complete i.e., the differential pressure upon completion of engagement.

Figure 5:
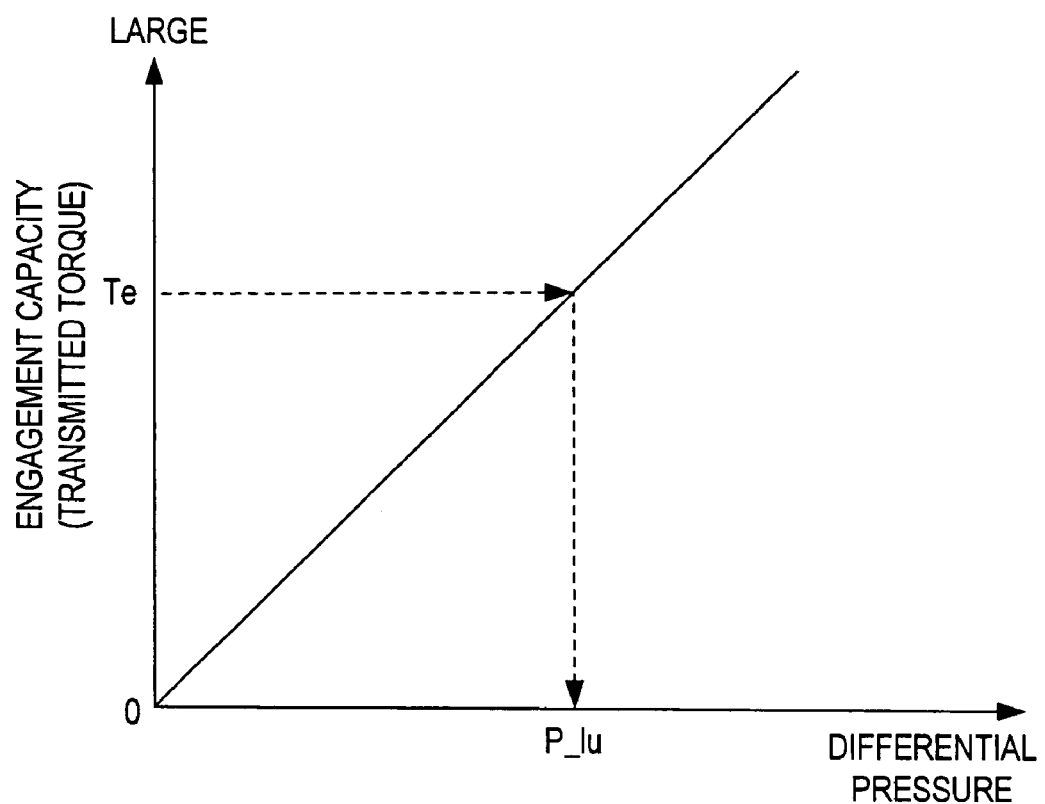
FIG. 5 is a map showing a relation between the engagement capacity (transmitted torque) of a lock-up clutch, and a differential pressure.

Alternatively, if the engagement capacity (transmitted torque) of the lock-up clutch 6 is Tlu, the relation Te=Tlu holds when smooth lock-up is complete. A linearly proportional relationship holds between the engagement capacity Tlu of the lock-up clutch 6 and the differential pressure, as shown by the map of FIG. 5. Therefore, the real differential pressure (engagement completion differential pressure) P_lu upon completion of engagement of the lock-up clutch 6 can be obtained from the engine torque Te at that time by referring to the map stored in the memory. The difference between the real differential pressure P_lu upon completion of engagement and the differential pressure command value P_ref upon completion of engagement may be calculated as the differential pressure deviation estimation value P_error (P_error=P_ref−P_lu).

Next, in a step S6, it is determined whether or not the absolute value of the differential pressure deviation estimation value P_error is equal to or less than a predetermined limit value ERROR_SL. When the absolute value of the differential pressure deviation estimation value P_error exceeds the predetermined limit value ERROR_SL, it is an extremely large value due to a signal error, etc. Therefore, when the absolute value of the differential pressure deviation estimation value P_error exceeds the limit value ERROR_SL, learning of the differential pressure deviation estimation value P_error is prohibited, and the routine terminates.

When the absolute value of the differential pressure deviation estimation value P_error is less than the limit value ERROR_SL, the routine proceeds to a step S7 where the oil temperature Tatf of the transmission 4 is read from the oil temperature sensor 12.

Figure 6:
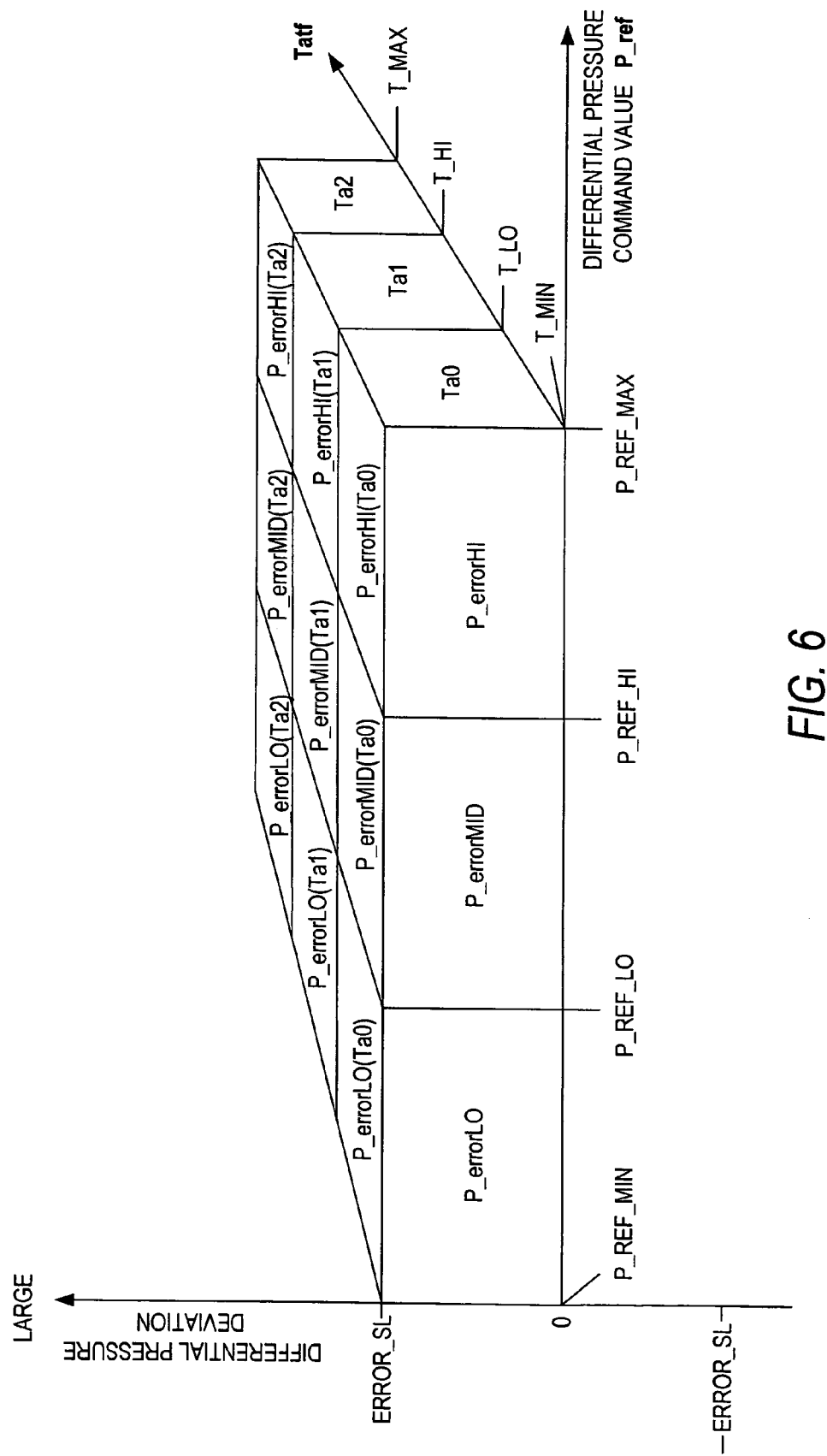
FIG. 6 is a schematic diagram showing a learning value storage region of a memory.

Next, in a step S8, a storage location of the differential pressure deviation learning value is selected from learning value storage regions, based on the differential pressure command value P_ref and oil temperature Tatf when engagement of the lock-up clutch 6 is complete. The learning value storage regions are preset in the memory, as shown in FIG. 6. In this embodiment, the learning value storage regions are represented by a matrix of three rows and three columns which respectively classify the range of oil temperature Tatf and the range of the differential pressure command value P_ref upon completion of engagement.

The range of the differential pressure command value P_ref upon completion of engagement is divided into three zones, i.e., a first differential pressure region (P_REF_MIN≦P_ref<P_REF_LO), a second differential pressure region (P_REF_LO≦P_ref<P_REF_HI) and a third differential pressure region (P_REF_HI≦ P_ref≦P_REF_MAX). Herein, P_REF_MIN shows a differential pressure command value minimum, P_REF_MAX shows a differential pressure command value maximum, P_REF_LO shows a predetermined low differential pressure command value and P_REF_HI shows a predetermined high differential pressure command value. The relation P_REF_MIN<P_REF_LO<P_REF_HI<P_REF_MAX holds. The first differential pressure region defines the row in which the differential pressure deviation learning value P_errorLO for a small differential pressure command value P_ref ranging from P_REF_MIN to P_REF_LO, is stored. The second differential pressure region defines the row in which the differential pressure deviation learning value P_errorMID for a medium differential pressure command value P_ref ranging from P_REF_LO to P_REF_HI, is stored. The third differential pressure region defines the row in which the differential pressure deviation learning value P_errorHI for a large differential pressure command value P_ref ranging from P_REF_Hi to P_REF_MAX, is stored.

The region of the oil temperature Tatf is divided into three zones, i.e., a first oil temperature region (T_MIN≦Tatf<T_LO), a second oil temperature region (T_LO≦Tatf<T_HI) and a third oil temperature region (T_HI≦Tatf<T_MAX). Herein, T_MIN shows the lowest oil temperature, T_MAX shows the highest oil temperature, T_LO shows a predetermined low oil temperature and T_HI shows a predetermined high oil temperature. The relation T_MIN<T_LO<T_HI<T_MAX holds.

The first oil temperature region defines the column in which the differential pressure deviation learning value for a low oil temperature Ta0 ranging from T_MIN to T_LO, is stored. The second oil temperature region defines the column in which the differential pressure deviation learning value for a medium oil temperature Ta1 ranging from T_LO to T_HI, is stored. The third oil temperature region defines the column in which the differential pressure deviation learning value for a high oil temperature Ta2 ranging from T_HI to T_MAX, is stored.

As mentioned above, the location at which the differential pressure deviation learning value will be stored or updated is determined based on three regions (rows) of the differential pressure command value P_ref, and three regions (columns) of the oil temperature Tatf. The nine elements of the matrix, i.e., nine learning values, are represented by P_errorLO(Tai) (i=0, 1, 2), P_errorMID(Tai) (i=0, 1, 2) and P_errorHI(Tai) (i=0, 1, 2).

Next, in a step S9, the presently stored learning value is read as P_errorN from the selected learning value storage location selected in the step S8.

In a step S10, a new learning value is computed. First, a difference P_error-P_errorN between the differential pressure deviation estimation value P_error and the presently stored learning value P_errorN is calculated. Next, the median of the three values, preset limit value (+ΔLM) on the increase side, preset limit value (−ΔLM) on the decrease side and difference P_error−P_errorN, is calculated. The result of adding the presently stored learning value P_errorN to the median is set as a new learning value.

New learning value=$P\_errorN$+mid($-\Delta LM, P\_error-P\_errorN, +\Delta LM$)

In this way, the variation amount of the learning value on one learning occasion falls within the limits of +ΔLM and −ΔLM, and sharp fluctuation of the learning value is prevented.

Next, in a step S11, the storage location selected in the step S8 is overwritten with the new learning value calculated in the step S10, and thus the learning value is updated at the storage location selected in the step S8.

Next, in a step S12, it is determined whether or not, in the row for the current updated learning value, there is a learning value for all of the columns Ta0-Ta2.

If there is a learning value in the whole oil temperature region of this row, the routine proceeds to a step S13. When at least one of the columns Ta0-Ta2 of this row has no learning value, the routine proceeds to a step S14.

In the step S13, the learning value P_learn(Tai) (=LUprs_OFFSET) used for slip control is set to the average value represented by the following formula:

$P\_learn(Tai)=(P\_errorLO(Tai)+P\_errorMID(Tai)+P\_errorHI(Tai))/3$ (where i=1,2,3)

For each oil temperature, the learning value is averaged with respect to the differential pressure command value P_ref. Hence, large differences of the learning value for the same oil temperature can be prevented.

The average difference pressure learning value P_learn (Tai) according to the oil temperature Tatf is used as LUprs_OFFSET for slip control. In slip control, when the oil temperature Tatf is in the first oil temperature range (T_MIN≦Tatf<T_LO), the average difference pressure learning value P_learn(Ta0) is used. When the oil temperature Tatf is in the second oil temperature range (T_LO≦Tatf<T_HI), the average difference pressure learning value P_learn(Ta1) is used. When the oil temperature Tatf is in the third oil temperature range (T_HI≦Tatf<T_MAX), the average difference pressure learning value P_learn(Ta2) is used.

Figure 7A:
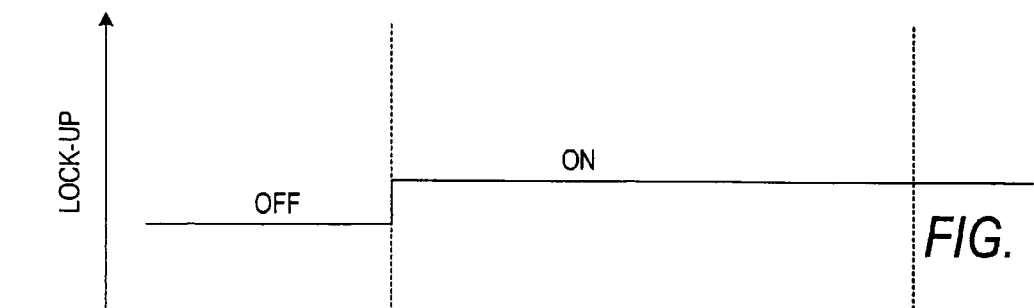
FIG. 7A is a time chart showing lock-up ON/OFF.
Figure 7B:
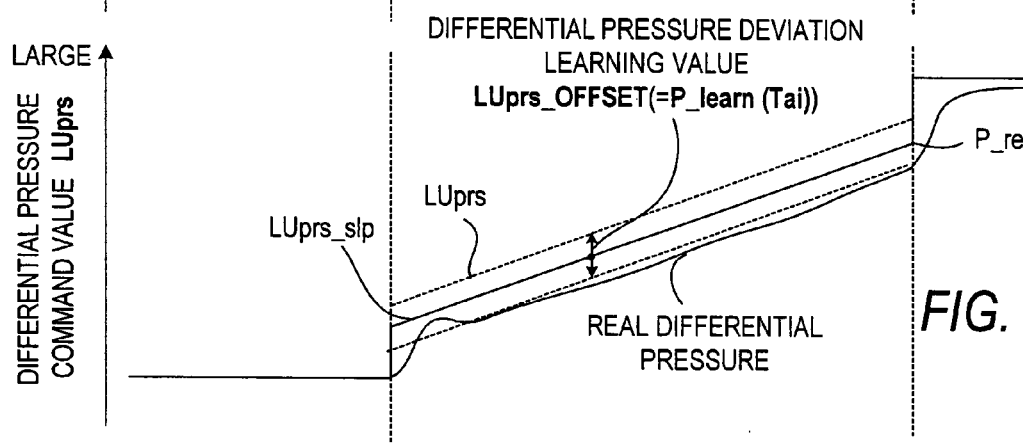
FIG. 7B is a time chart showing a differential pressure command value.
Figure 7C:
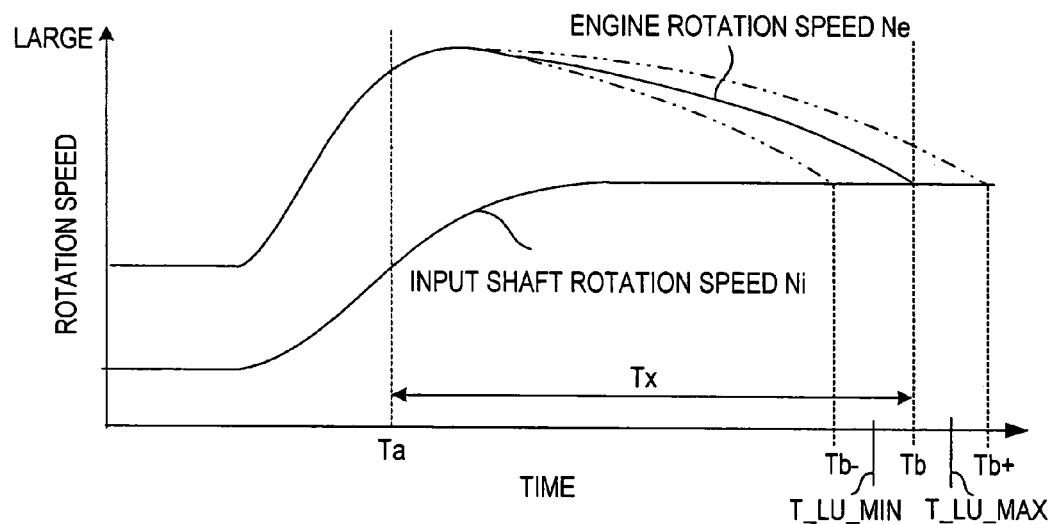
FIG. 7C is a time chart showing an engine rotation speed and input shaft rotation speed.

Next, in a step S14, processing to prevent learning errors is performed. Referring to FIG. 7, when the lock-up clutch completely engages at a time Tb− which is earlier than a lower limit T_LU_MIN, and when the lock-up clutch completely engages at a time Tb+ which is later than an upper limit T_LU_MAX, it is determined that the differential pressure learning value LUprs_OFFSET has shifted due to learning error, so the present learning value P_learn(Tai) is reset to zero, and initialized so that learning can start again. The scheduled time Tb at which engagement of the lock-up clutch 6 completes is a value obtained by adding a predetermined period Tx to an engagement start time Ta. The lower limit T_LU_MIN is smaller than the scheduled time Tb by a predetermined value, and the upper limit T_LU_MAX is larger than the scheduled time Tb by a predetermined value. The predetermined period Tx may range from 1 to 5 seconds.

The effect of this embodiment will now be described.

According to this embodiment, a learning value relating to the differential pressure deviation is found from the difference of the real differential pressure (engagement completion differential pressure) and differential pressure command value when engagement of the lock-up is complete, so learning can be performed promptly. As the differential pressure command value is corrected by this learning value, scatter in the engagement completion timing on the next occasion when lock-up is performed can be suppressed.

The learning value is stored in relation to the differential pressure command value and the oil temperature of the transmission, so learning can be performed for each oil temperature. Hence, scatter in the engagement timing of the lock-up clutch can be definitively suppressed. It should be noted that the difference between the differential pressure command value and the real differential pressure depends on the oil temperature. As oil is supplied to the torque converter and transmission, the oil temperature of the transmission is a measure or guide of the oil temperature of the torque converter (temperature of the oil supplied to the lock-up clutch). The oil temperature affects the difference between the differential pressure command value and the real differential pressure. Specifically, the AT controller 1 searches the differential pressure deviation learning value LUprs_OFFSET (P_learn (Tai)) from the oil temperature Tatf, and adds the differential pressure deviation learning value LUprs_OFFSET to the slip command value LUprs_slp. In this way, on the next occasion smooth lock-up is performed, scatter in the engagement completion timing is suppressed by suppressing the effect of variation of the oil temperature Tatf and time-dependent variation of the lock-up clutch.

The learning value is stored by the memory for each oil temperature Tatf of the transmission 4 and for each the differential pressure command value P_ref, so learning can be performed for each oil temperature Tatf and for each the differential pressure command value P_ref.

The differential pressure deviation learning value P_learn (Tai) finally used in slip control is the value obtained by averaging the differential pressure learning values P_errorLO (Tai), P_errorMID(Tai), P_errorHI(Tai) relating to plural differential pressure command values for each oil temperature region. Thus, the error in the learning value P_error becomes small.

Further, by setting the learning prohibition conditions, learning is permitted only when smooth lock-up has been completed. Thus, the differential pressure deviation estimation value P_error can be calculated with higher precision based on the engine torque signal.

Although the invention has been described above by reference to a certain embodiment of the invention, the invention is not limited to the embodiment described above.

In the above embodiment, averaging was performed when the learning value of the whole temperature region of a certain row was stored. However, averaging may be performed when plural learning values have been stored in a certain row.

Figure 8A:
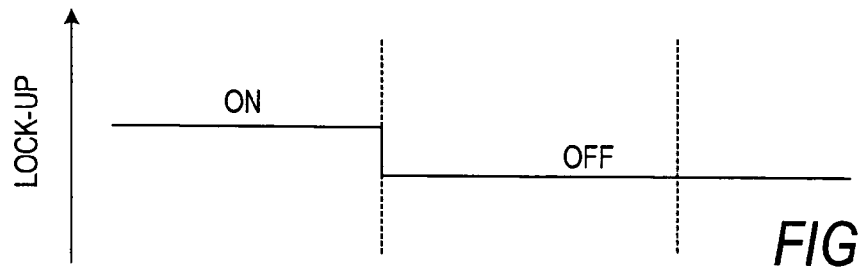
FIG. 8A is a time chart showing lock-up ON/OFF.
Figure 8B:
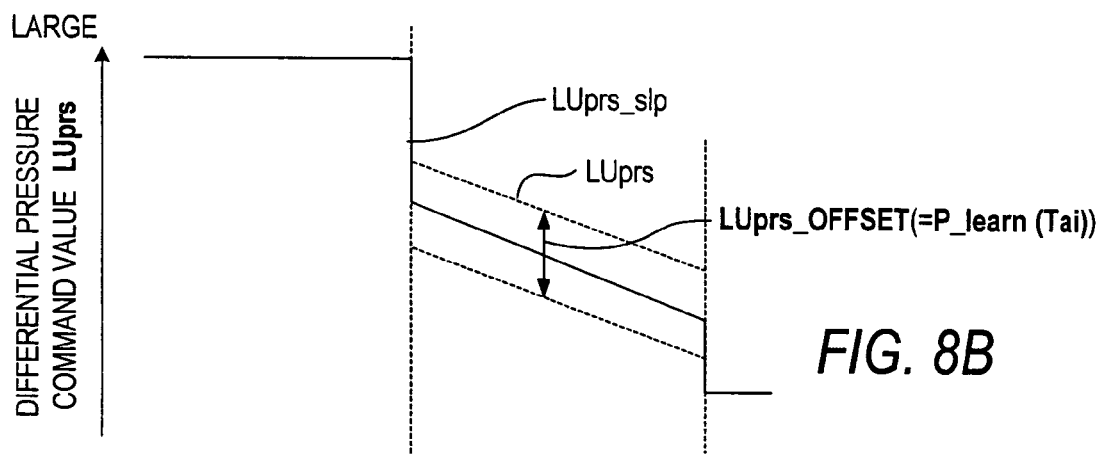
FIG. 8B is a time chart showing the differential pressure command value.
Figure 8C:
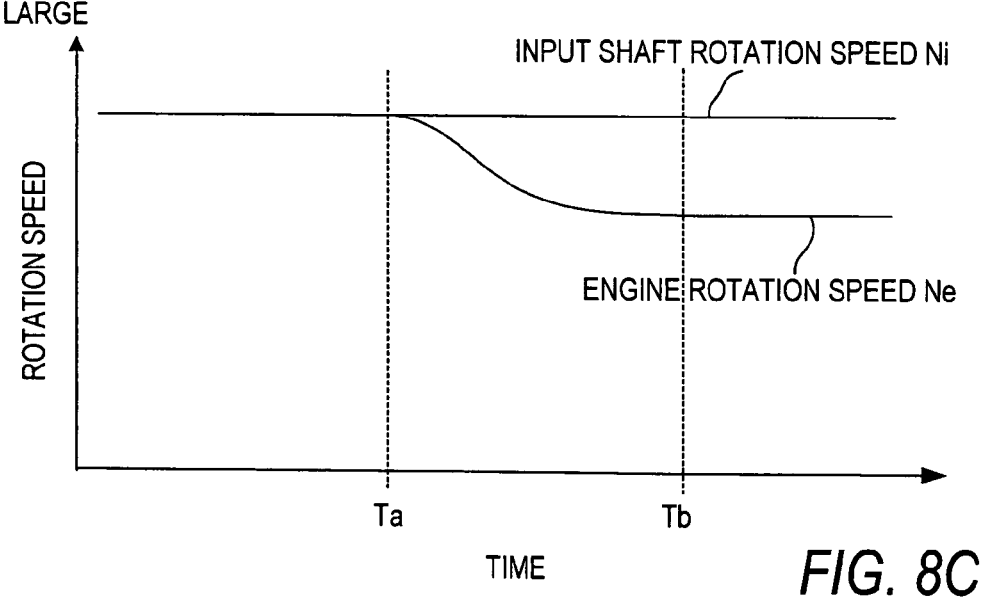
FIG. 8C is a time chart showing the engine rotation speed and input shaft rotation speed.

In the aforesaid embodiment, learning values are used when the lock-up clutch engages. However, learning values may be used when the lock-up clutch 6 smoothly releases. In other words, as shown in FIG. 8, a learning value can be added to the slip command value LUprs_slp when the lock-up clutch 6 is released. In this way, the time from the start of release of the lock-up clutch to the completion of release of the lock-up clutch 6 can be made constant irrespective of change of the oil temperature Tatf.

In the aforesaid embodiment, to simplify the description, an example of ramp control was shown. However, ramp control of the corrected differential pressure command value LUprs may be performed with a slope α up to a predetermined time after determining that lock-up should be ON based on running conditions such as vehicle speed, and feedback control or feedforward control subsequently performed to achieve a target slip rotation speed calculated according to the running state.

In the aforesaid embodiment, the AT controller 1 received the engine torque Te from the engine controller 2, but the AT controller 1 can receive the accelerator pedal stroke APO and engine rotation speed Ne (or pump impeller rotation speed Np) from the accelerator pedal stroke sensor 14 and engine rotation speed sensor 15, and compute the engine torque Te from the accelerator pedal stroke APO and engine rotation speed Ne referring to a preset engine performance map.

Modifications and variations of the embodiments described above will occur to those skilled in the art, in light of the above teachings. The scope of the invention is defined with reference to the following claims.

The entire contents of Japanese Patent Application P2004-106506 (filed Mar. 31, 2004) are incorporated herein by reference.

What is claimed is:

1. A lock-up clutch control device which controls a lock-up clutch provided in a torque converter installed between an engine and a transmission, wherein the lock-up clutch control device changes over between a converter state and a lock-up state of the torque converter according to a differential pressure command value relating to a differential pressure supplied to the lock-up clutch, the lock-up clutch control device comprising:

a differential pressure generating device which generates the differential pressure supplied to the lock-up clutch;

input torque detection means which detects an input torque to the torque converter; and a controller programmed to:

compute a real differential pressure based on the detected input torque upon completion of engagement of the lock-up clutch;

compute a learning value relating to a differential pressure deviation, based on a difference between the computed real differential pressure and the differential pressure command value upon completion of the engagement of the lock-up clutch, and store the learning value;

correct a present differential pressure command value based on the learning value; and send the corrected differential pressure command value to the differential pressure generating device.

2. The control device as defined in claim 1, further comprising a sensor which detects a temperature of an oil which generates the differential pressure, wherein the controller is programmed to store the learning value together with the detected oil temperature when engagement of the lock-up clutch is complete, and corrects the present differential pressure command value based on the learning value associated with the detected oil temperature.

3. The control device as defined in claim 2, wherein the controller is programmed to store the learning value in a storage location corresponding to the oil temperature and the differential pressure command value upon completion of the engagement of the lock-up clutch.

4. The control device as defined in claim 1, wherein the controller is programmed to store the learning value only when the lock-up clutch has performed a smooth lock-up.

5. The control device as defined in claim 1, wherein the controller is programmed to detect a time from start to completion of engagement of the lock-up clutch, and reset the stored learning value when the time is outside a preset range.

6. The control device as defined in claim 1, wherein the controller is programmed to:

store the learning value together with the differential pressure command value upon completion of the engagement of the lock-up clutch;

average plural learning values associated with differential pressure command values upon completion of the engagement of the lock-up; and correct the present differential pressure command value based on the averaged learning value.

7. The control device as defined in claim 1, wherein the controller is programmed to compute the real differential pressure from an engine torque when engagement of the lock-up clutch is complete, which is equivalent to an engagement capacity, by referring to a map specifying a relation between the engagement capacity of the lock-up clutch and the differential pressure.

8. The control device as defined in claim 1, wherein the controller is programmed to correct the present differential pressure command value, by adding the learning value to the present differential pressure command value.

9. The control device as defined in claim 1, further comprising a first rotation speed sensor for detecting an output rotation speed from the torque converter and a second rotation speed sensor for detecting an input rotation speed to the torque converter, wherein the controller is programmed to calculate a slip rotation speed of the torque converter from the detected input and output rotation speeds, and set the present differential pressure command value based on the slip rotation speed of the torque converter.

10. The control device as defined in claim 1, wherein the corrected differential pressure command value increases with time.

11. A lock-up clutch control device which controls a lock-up clutch provided in a torque converter installed between an engine and a transmission, wherein the lock-up clutch control device changes over between a converter state and a lock-up state of the torque converter according to a differential pressure command value relating to a differential pressure supplied to the lock-up clutch, the lock-up clutch control device comprising:

differential pressure generating means for generating the differential pressure supplied to the lock-up clutch;

input torque detection means for detecting an input torque to the torque converter;

computing means for computing a real differential pressure based on the detected input torque upon completion of engagement of the lock-up clutch;

computing means for computing a learning value relating to a differential pressure deviation applied to the lock-up clutch, based on a difference between the computed real differential pressure and the differential pressure command value upon completion of the engagement of the lock-up clutch, and storing the learning value;

correcting means for correcting a present differential pressure command value based on the learning value; and sending means for sending the corrected differential pressure command value to the differential pressure generating means.

12. A lock-up clutch control method for controlling lock-up of a lock-up clutch provided in a torque converter installed between an engine and a transmission, the lock-up clutch control method comprising the steps of:

detecting an input torque to the torque converter;

computing, by using a computer assembly, a real differential pressure based on the detected input torque upon completion of engagement of the lock-up clutch;

computing, by using the computer assembly, a learning value relating to a differential pressure deviation, based on a difference between the computed real differential pressure and a differential pressure command value upon completion of the engagement of the lock-up clutch, and storing, by using the computer assembly, the learning value;

correcting, by using the computer assembly, a present differential pressure command value based on the learning value; and sending, by using the computer assembly, the corrected differential pressure command value to a differential pressure generating device which generates a differential pressure supplied to the lock-up clutch according to the corrected differential pressure command value.

* * * * *